United States Patent
Sharma et al.

(10) Patent No.: US 7,506,124 B2
(45) Date of Patent: Mar. 17, 2009

(54) APPARATUS AND METHODS FOR FACILITATING DATA TAPPING WITH HOST CLUSTERING IN A STORAGE AREA NETWORK

(75) Inventors: Samar Sharma, San Jose, CA (US); Roy M. D'Cruz, Sunnyvale, CA (US); Jhaanaki M. Krishnan, San Jose, CA (US); Prashant Billore, San Jose, CA (US); Sanjaya Kumar, Fremont, CA (US); Dinesh G. Dutt, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 304 days.

(21) Appl. No.: 11/361,119

(22) Filed: Feb. 24, 2006

(65) Prior Publication Data

US 2007/0011424 A1 Jan. 11, 2007

Related U.S. Application Data

(63) Continuation-in-part of application No. 11/177,880, filed on Jul. 8, 2005, now Pat. No. 7,356,573.

(51) Int. Cl.
*G06F 12/00* (2006.01)
(52) U.S. Cl. ...................... 711/165; 370/392
(58) Field of Classification Search .................. 711/165
See application file for complete search history.

(56) References Cited

U.S. PATENT DOCUMENTS

| 6,182,197 | B1 | 1/2001 | Dias et al. | |
|---|---|---|---|---|
| 6,681,310 | B1 | 1/2004 | Kusters et al. | |
| 6,735,636 | B1 | 5/2004 | Mokryn et al. | |
| 7,003,780 | B2 | 2/2006 | Peloquin et al. | |
| 7,072,894 | B2 | 7/2006 | Loy et al. | |
| 7,089,384 | B2 * | 8/2006 | Tross et al. | 711/162 |
| 7,318,133 | B2 * | 1/2008 | Yagawa et al. | 711/162 |
| 2001/0037371 | A1 | 11/2001 | Ohran | |
| 2002/0191649 | A1 | 12/2002 | Woodring | |
| 2004/0143639 | A1 | 7/2004 | Rangan et al. | |

(Continued)

OTHER PUBLICATIONS

Office Action dated Jun. 27, 2007, received in related U.S. Appl. No. 11/177,800 [10 pgs].

(Continued)

*Primary Examiner*—Kevin Ellis
*Assistant Examiner*—Hashem Farrokh
(74) *Attorney, Agent, or Firm*—Weaver Austin Villeneuve & Sampson LLP

(57) ABSTRACT

Disclosed is apparatus and methods for enabling an appliance to receive data being sent between any host of a host cluster to a specified storage device's logical unit (LUN) in a single stream or session. In one embodiment, a data virtual target is initially set up for a specified storage device LUN so that data written from a host to the specified storage device LUN is received by the DVT. An appliance then sends a session request to mirror data that is sent to the DVT (and specified storage device LUN) to a specified LUN of the appliance. The session request is not host specific. That is, data that is sent by any host to the DVT is mirrored to the same appliance LUN.

22 Claims, 9 Drawing Sheets

U.S. PATENT DOCUMENTS

| | | | |
|---|---|---|---|
| 2004/0210677 A1* | 10/2004 | Ravindran et al. | 710/1 |
| 2005/0157730 A1 | 7/2005 | Grant et al. | |
| 2005/0256972 A1* | 11/2005 | Cochran et al. | 709/245 |
| 2006/0013222 A1 | 1/2006 | Rangan et al. | |
| 2006/0080416 A1* | 4/2006 | Gandhi | 709/220 |
| 2007/0140236 A1* | 6/2007 | Parthasarathy et al. | 370/389 |

OTHER PUBLICATIONS

International Search Report dated Sep. 13, 2007, received in related PCT Application No. PCT/US06/26640 (2 pages).

Written Opinion dated Sep. 13, 2007, received in related PCT Application No. PCT/US06/26640 (6 pages).

EMC2 and Fujitsu Siemens Computers, Global Recovery Demonstration: SRDF/A and Primecluster-EMC Remote Data Facility/Asynchronous Fujitsu Siemens Computers Primecluster, Feb. 2004, pp. 1-26.

EMC2, EMC SRDF Family, Powerful remote replication solutions improve organizational productivity, enhance online business continuity, Sep. 2004.

* cited by examiner

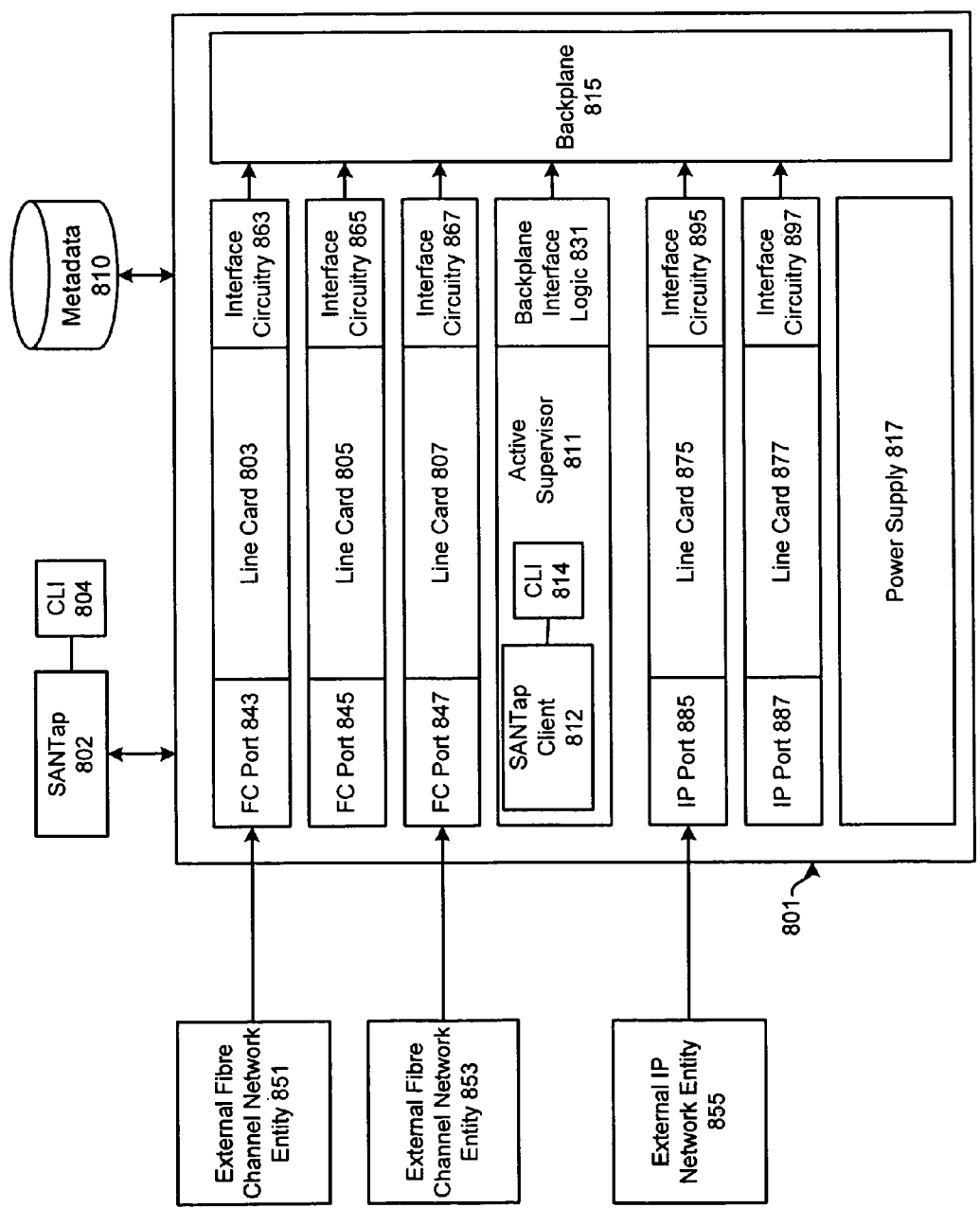

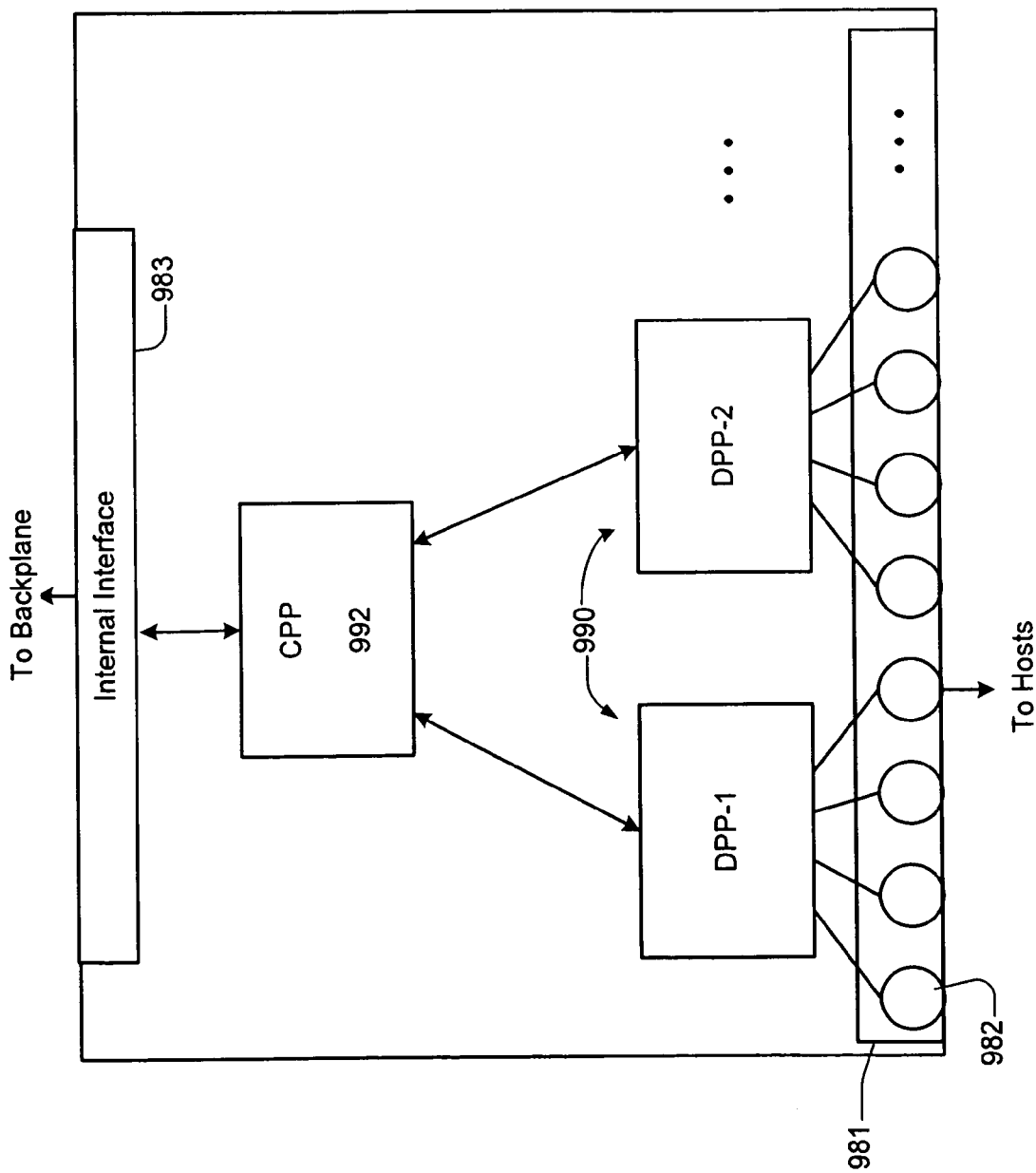

ial target LUN is mirrored to the

APPARATUS AND METHODS FOR FACILITATING DATA TAPPING WITH HOST CLUSTERING IN A STORAGE AREA NETWORK

CROSS REFERENCE TO RELATED PATENT APPLICATION

This application is a continuation-in-part and claims priority of U.S. patent application Ser. No. 11/177,880, filed 8 Jul. 2005 now U.S. Pat. No. 7,356,573 by Samar Sharma et al., which application is incorporated herein by reference in its entirety for all purposes.

BACKGROUND OF THE INVENTION

The present invention relates to storage area networks. More particularly, the present invention relates to methods and apparatus for facilitating intelligent services with respect to data flowing between a host and a storage device, or the like.

In recent years, the capacity of storage devices has not increased as fast as the demand for storage. Additionally, a host may wish to use multiple storage devices because it needs tiered and heterogeneous storage or because storage management facilities are needed for reasons specific to the storage environment. For example, it may be desirable to use database tables on a fast storage device, and other tables on a slower or less expensive storage device.

In order to solve these storage limitations, the storage area network (SAN) was developed. Generally, a storage area network is a high-speed special-purpose network that interconnects different data storage devices and associated data hosts on behalf of a larger network of users.

Recently, mechanisms for tapping data flows within a SAN have been provided so as to facilitate applications that could use such tapped data, such as continuous backup, traffic analysis, or remote replication applications. Several embodiments of a data tapping system are further described in co-pending U.S. patent application Ser. No. 11/177,880, filed 8 Jul. 2005 by Samar Sharma et al., which application is incorporated herein by reference in its entirety for all purposes. In general, mechanisms are provided in a SAN to tap data flowing between a host and a storage device. In one implementation, data sent by a specific host to a specific storage device is intercepted. The intercepted data or a copy of such data is then sent to both the specific storage device and to an appliance.

Although the basic data tapping scheme advantageously provides a new and useful service with respect to a SAN, there are continuing efforts to provide improvements of such a data tapping scheme.

SUMMARY OF THE INVENTION

The present invention provides apparatus and methods for enabling an appliance to receive data being sent between any host of a host cluster to a specified storage device's logical unit (LUN) in a single stream or session. In one embodiment, a data virtual target is initially set up for a specified storage device LUN so that data written from a host to the specified storage device LUN is received by the DVT. An appliance then sends a session request to mirror data that is sent to the DVT (and specified storage device LUN) to a specified LUN of the appliance. The session request is not host specific. That is, data that is sent by any host to the DVT is mirrored to the same appliance LUN.

In one embodiment, a method of tapping data in a storage area network (SAN) is disclosed. A request received for tapping data sent from a host cluster to a particular target logical unit (LUN) of a storage device of the SAN so that the data is mirrored to an appliance. When any host of the host cluster writes data to the particular target LUN, such data is mirrored to the appliance. In one aspect, data written by any of the hosts of the host cluster to the particular target LUN is mirrored together in a single first stream to the appliance. In another aspect, data written by any of the hosts of the host cluster to the particular target LUN is mirrored to a same LUN of the appliance.

In a specific implementation, the request for tapping data is in the form of a first request for creating a data virtual target (DVT) corresponding to the particular storage device and a second request for creating a session that includes the particular target LUN visible on such DVT. In a further aspect, the second request has a host initiator field that is set to indicate host clustering. In yet a further aspect, the host initiator field is set equal to zero, wherein a zero value indicates host clustering and a nonzero value would identify a particular host for data tapping. For example, mirroring the data to the appliance is accomplished by installing a same appliance mirror for all hosts that have access to the particular target LUN. In one embodiment, the same appliance mirror causes the data to be mirrored to a same LUN of the appliance. In an alternative embodiment, the process waits for a new host to log into the DVT, and the same appliance mirror is installed for the new host if the new host has access to the particular target LUN.

In another embodiment, a request is received for tapping data sent between a specific host and the particular target LUN. When the specified host writes second data to the particular target LUN, such second data is mirrored to the appliance. The second data is sent in a second stream to the appliance and the second stream differs from the first stream. In one aspect, the first stream is sent to a first LUN of the appliance and the second stream is sent to a second LUN of the appliance.

In another embodiment, the invention pertains to an apparatus operable to tap data in a storage area network (SAN). The apparatus includes one or more processors and one or more memory. At least one of the memory and processors are adapted to provide at least some of the above described method operations.

In an alternative embodiment, the invention pertains to a system for tapping data in a storage area network (SAN). The system includes a host cluster having a plurality of hosts, a storage device for storing data, an appliance for tapping data in the SAN, and a network device in the SAN operable to (i) receive from the appliance a request for tapping data sent from the host cluster to a particular target logical unit (LUN) of a storage device of the SAN so that the data is mirrored to the appliance and (ii) when any host of the host cluster writes data to the particular target LUN, mirror such data to the appliance.

These and other features and advantages of the present invention will be presented in more detail in the following specification of the invention and the accompanying figures which illustrate by way of example the principles of the invention.

BRIEF DESCRIPTION OF THE DRAWINGS

FIG. 8 is a diagrammatic representation of one example of a fibre channel switch that can be used to implement techniques of the present invention.

FIG. 9 is a block diagram illustrating a portion of an exemplary switch or intelligent line card in which various embodiments of the present invention may be implemented.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
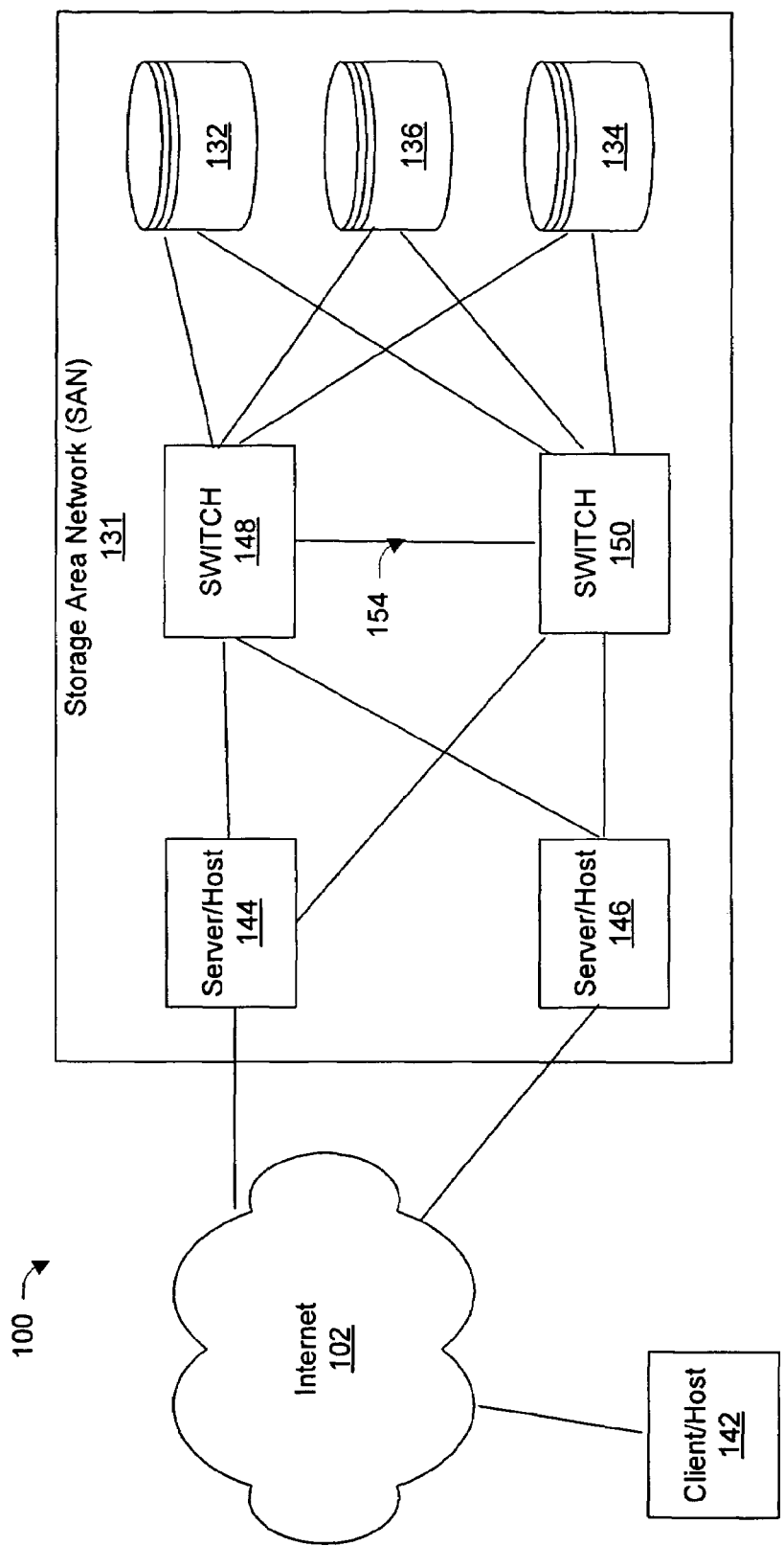
FIG. 1 is a block diagram illustrating an exemplary storage area network in which various embodiments of the invention may be implemented.

FIG. 1 is a block diagram illustrating an exemplary network 100 in which various embodiments of the invention may be implemented. As shown, network 100 includes a storage area network (SAN) 131, such as a bank's financial data center, for handling requests for data as initiated by any suitable type of entity, such as a customer's host or client computer 142. Of course, a plurality of hosts/clients (not shown) typically would be able to access such a SAN 131. In current networks, the client 142 typically sends requests to SAN 131 via a wide area network, such as the Internet 102. The SAN 131 may also implement virtualization, and such a network may be referred to as a virtual storage area network (VSAN). Virtualization generally refers to the use of software entities to represent one or more physical entities. For example, a virtual port (e.g., of a switch) may represent two physical ports (e.g., of the switch). However, so as to simplify this initial description, only a SAN without virtualization will be described although embodiments of the present invention include at least some virtualized entities in the SAN.

In a SAN, data may be read from, as well as written to, various portions of a plurality of storage devices (e.g., 132, 134, and 136) within SAN 131 in response to commands sent by client 142 to one or more servers or hosts, e.g., 144 and 146, of SAN 131. In general, the data may be accessed by any number of hosts or clients although not illustrated in FIG. 1. Communication among the storage devices and hosts is accomplished by coupling the storage devices and hosts together via one or more switches, routers, or other network nodes configured to perform switching functions. In this example, switches 148 and 150 may also communicate with one another via an interswitch link 154.

Although the network devices described above with reference to FIG. 1 are described as switches, the present invention may be practiced with respect to any suitable type of network device. Thus, other network devices such as routers may be implemented to receive, process, modify and/or generate packets or frames with functionality such as that described herein for transmission in a storage area network. Moreover, the network devices described herein are merely illustrative, and therefore other configurations of a network device may be utilized to implement the disclosed inventive embodiments.

In some of the discussion herein, the functions of switches of this invention are described in terms of the SCSI protocol. This is because many storage area networks in commerce run a SCSI protocol to access storage sites. However, the present invention may be implemented using any suitable device connectivity protocol, besides SCSI. Currently, storage area networks also employ the Fibre Channel (FC) protocol (FC-PH (ANSI X3.230-1994, Fibre Channel—Physical and Signaling Interface) as a lower level protocol and runs IP (Internet Protocol) and SCSI on top of Fibre Channel. Note that the invention is not limited to any of these protocols and may be applied to any protocol, such as FC, iSCSI, FCIP, iFCP, Ethernet, etc. The implemented protocols may also include any permutation of SCSI, such as SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the described procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a virtual or physical device that performs an operation requested by an initiator. For example, a target physical or virtual memory disk will obtain or write data as initially requested by a host initiator. Note that while the host initiator may provide instructions to READ from or WRITE to a "virtual" target having a virtual address, a fabric switch (or some other mechanism) first converts those instructions to a physical target address before instructing the target.

Figure 2:
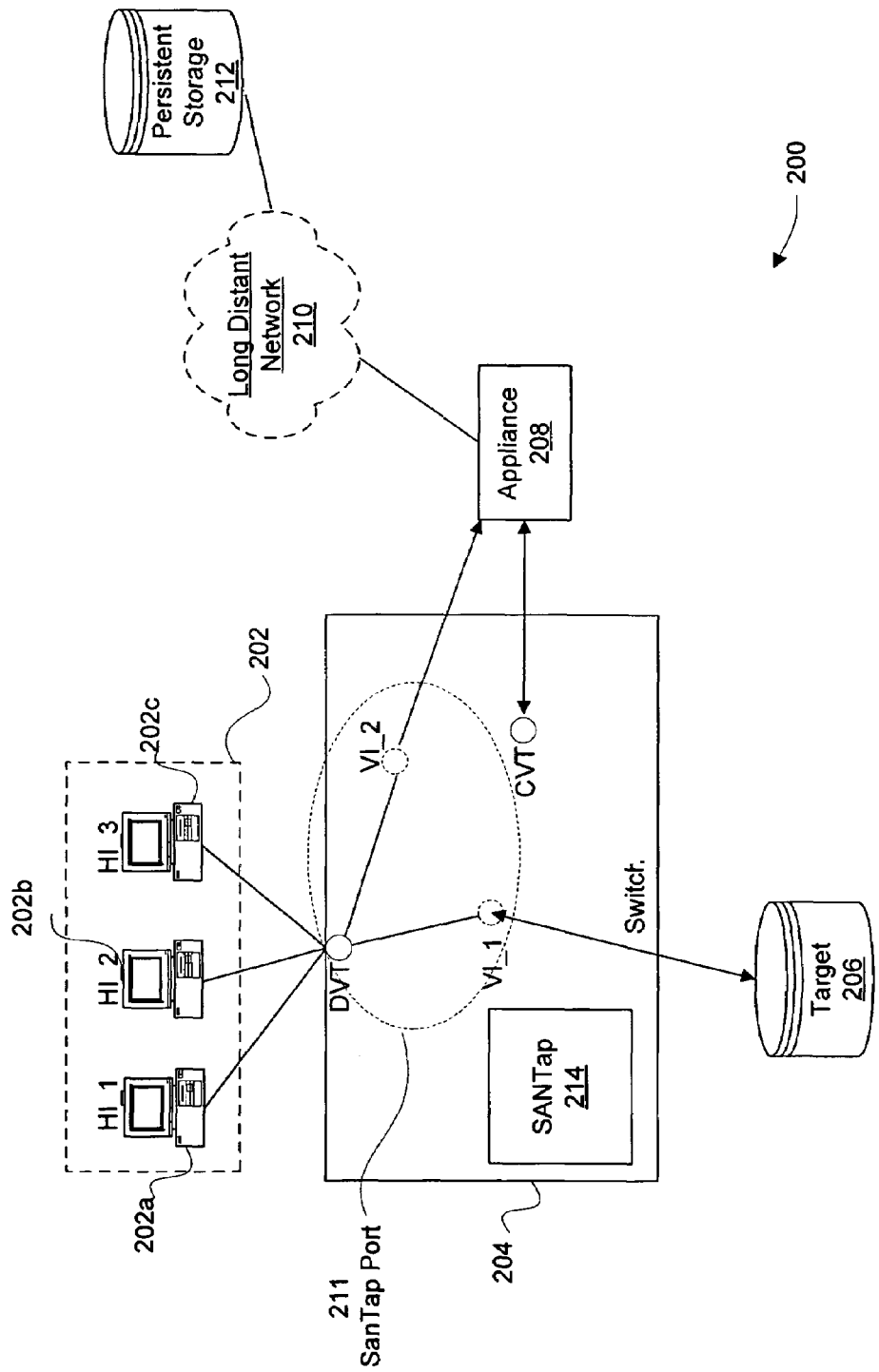
FIG. 2 is a diagrammatic representation of a network segment that includes a switch that is set up to allow an appliance to tap a data session between a host cluster and a target in accordance with one embodiment of the present invention.

Embodiments of the present invention facilitate an appliance to tap data communicated between a host cluster and a specific target LUN. That is, when initiators of a host cluster perform data WRITE's to the same, specified target LUN for which data tapping has been enabled for a particular appliance, all data WRITES from the host cluster initiators are merged into a single stream that is mirrored to the particular appliance. FIG. 2 is a diagrammatic representation of a network segment 200 that includes an appliance 208 for tapping a data session between a host cluster 202 and a target 206 in accordance with one embodiment of the present invention. Of course, any number of appliances may tap data from one or more sessions between any number of initiator (or host cluster) and target pairs. As shown, host cluster 202 includes host initiators 202a ($HI_{13}$ 1), 202b (HI_2), and 203c (HI_3).

Each initiator of the host cluster 202 accesses (e.g., READ or WRITE) target 206 via switch 204. Typically, a pair of redundant switches (not shown) are used in the event of failure of one of the switches. Also, SCSI targets, such as storage disks or physical logical units (PLUNs), are directly accessible by SCSI initiators (e.g., hosts). Similarly, even when VLUNs (virtual logical units) are implemented, the VLUNs are visible and accessible to the SCSI initiators. Thus, each initiator will typically identify those PLUNs or VLUNs that are available to it. More specifically, the initiator typically determines which SCSI target ports are available to it. The initiator may then ask each of those SCSI target ports which PLUNs or VLUNs are available via those SCSI target ports. The procedures for an initiator to identify the target ports and LUNs available to it generally include various handshaking procedures for querying the switch and ports for such information.

As shown, appliance 208 is coupled to switch 204, and such switch 204 is configured or set up to allow the appliance access to data flowing between host cluster 202 and target 206. Appliances generally may be configured to store SAN or VSAN data in persistent memory (e.g., 212) for various applications without disrupting the flow in the SAN or VSAN. In one application, data written from the host cluster to the target is replicated on a remote site by the appliance. For example, appliance 208 replicates data being sent from host cluster 202 to target 206 and this replicated data is sent to a remote persistent storage 212 via an optional long distance network 210. In another application, data I/O between a host cluster and target is tracked for each increment of time so that logs of I/O for discrete periods of time are retained for later use. This retained data I/O can then be retrieved for a particular time period, for example, to recover data that was lost for such period of time. The retrieved data may also be analyzed over specific periods of time for various purposes.

Such a SAN data tapping scheme is referred to herein as "SANTap" 214. Generally, SANTap is operable to allow an appliance to tap into the SAN or VSAN data flow for various applications. In other words, embodiments of SANTap serve as enablers of appliance applications that require copies of SAN or VSAN data. Any suitable mechanism may be used to allow an appliance to tap the data I/O between an initiator or set of initiators in the form of a host cluster and target.

In one implementation, a software entity for handling a SANTap is configured or set up in the switch. This software entity may include one or more data virtual target (DVT) and virtual initiator (VI) pairs. In one implementation, the appliance causes one or more DVT and VI pairs to be set up in a switch as needed. Several mechanisms for forming and handling virtual targets and virtual initiators are described further in "Cisco MDS 9000 Family Configuration Guide, Cisco MDS SAN-OS Release 1.1(1a)", Cisco Systems, Inc., January 2004, http://www.cisco.com and co-pending U.S. patent application Ser. No. 10/056,238, entitled METHODS AND APPARATUS FOR IMPLEMENTING VIRTUALIZATION OF STORAGE WITHIN A STORAGE AREA NETWORK, filed 23 Jan. 2002 by Thomas James Edsall et al. This document and patent application are incorporated herein by reference in their entirety for all purposes.

As shown in the example implementation of FIG. 2, a DVT is set up between host cluster 202 and target 206. The target and/or initiators of the host cluster may be virtual or real, physical devices. The DVT is configured to intercept data I/O sent from any initiator of the host cluster 202 to the target 206. The intercepted data is then mirrored from one or two virtual initiator (VI) entities, e.g., VI_1 and VI_2 in the illustrated example. Entity VI_1 routes this data I/O to the destination or real target 206, and VI_2 routes this data I/O to associated appliance 208. This set of virtual entities (DVT, VI_1, and VI_2) may be referred to as a SANTap port 211. Several DVT and VI arrangements are further described below. This SANTap port is just one example of an entity for performing such operations and is not meant to limit the scope of the invention to a specific DVT and VI configuration.

A SANTap port may be configured using any suitable mechanism and/or configured by any suitable entity. Preferably, each appliance is operable to configure a DVT in an appropriate switch as needed for its particular application. In a specific implementation, an appliance causes the switch to set up a DVT by sending a "session create" command to the switch. As shown, a control virtual target (CVT) is first set up in the switch for receiving commands from the appliance 208. The appliance 208 specifies to the switch through such CVT various aspects of a specific SANTap. The appliance may also specify various other commands for affecting the data tap via its CVT. By way of example, the appliance may issue commands via its CVT to set up a DVT in the switch for a particular initiator and target session, initiate data copying from such session, cease data copying for such session, quiesce, unquiesce, special behaviors, etc. In the illustrated embodiment, appliance 208 specifies through CVT that DVT is to be created so as to tap data flowing between host cluster 202 and target 206. Appliance 208 may also stop the data tap through such DVT.

Figure 3:
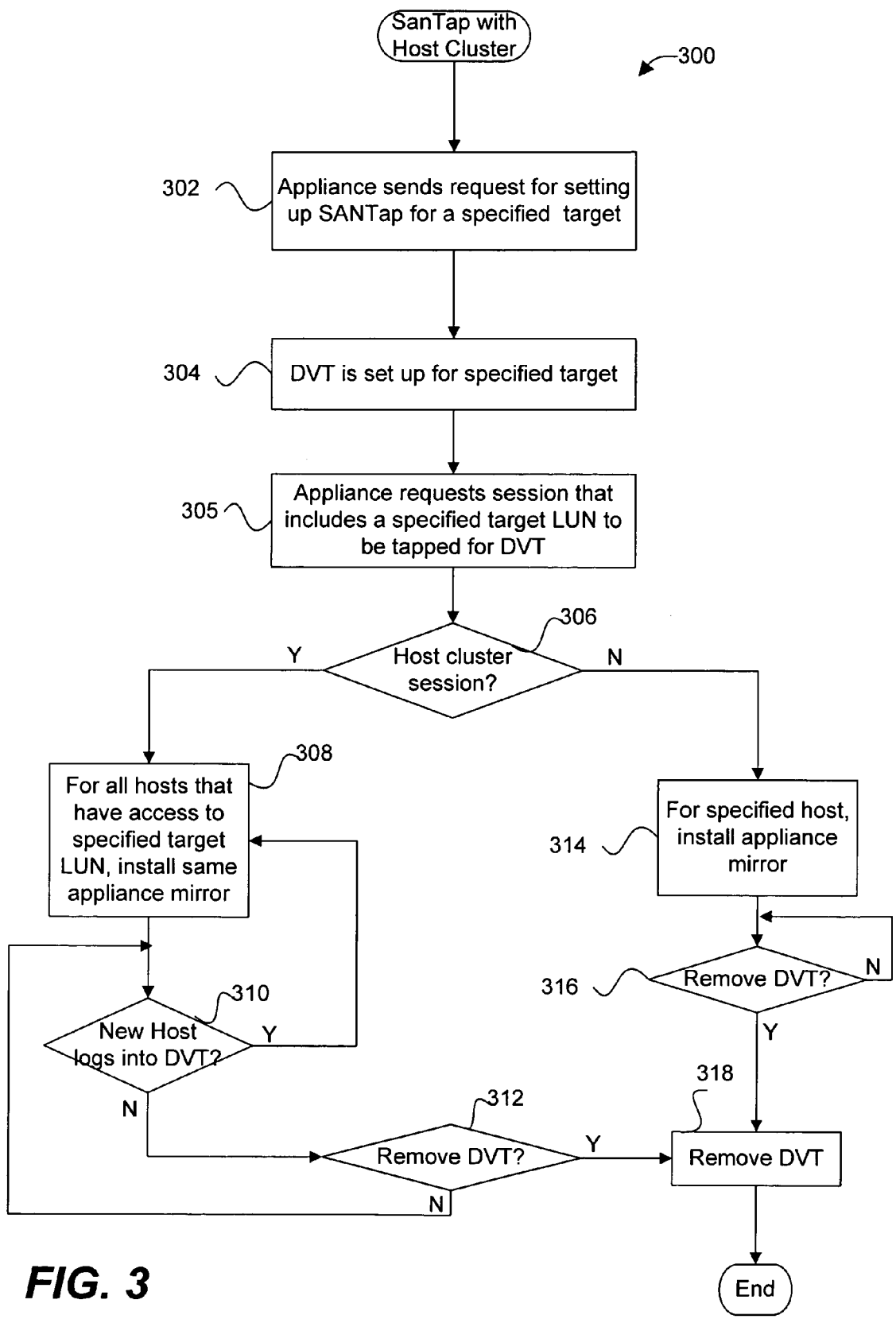
FIG. 3 is a flow chart illustrating a procedure for tapping data between a host cluster and a specified target LUN(s) in accordance with one embodiment of the present invention.

In general, embodiments of the present invention allow an appliance to mirror data that is sent to a specified target LUN by an entire host cluster to an appliance in a single stream. That is, data that is being written by any host of a host cluster to a specified target LUN is mirrored to a particular appliance LUN. Of course, this same process may be implemented for a range of specified target LUN's. Data tapping for a particular session that is host independent may be accomplished in any suitable manner. FIG. 3 is a flow chart illustrating a procedure 300 for tapping data between a host cluster and a specified target LUN in accordance with one embodiment of the present invention. The following procedure illustrates set up of a SANTap process for a particular session with or without host clustering enabled. However, this same general procedure may be practiced for any number of sessions. That is, a first SANTap process may be set up for a first host cluster and target LUN and a second SANTap process is set up for a second host cluster and target LUN. Also, the following procedure is described in relation to a single appliance setting up SANTap for a particular session with or without host clustering being enabled. Of course, this procedure can be implemented for any number of appliances which are initiating a SANTap process for the same or different target and initiator (or host cluster) pairs.

Initially, an appliance may send a request for setting up SANTap for a specified target in operation 302. In response, DVT is then set up for the specified target, for example, by the switch that receives the request, in operation 304. The appliance may then request that a session that includes a specified target LUN be tapped for the DVT in operation 305. For instance, the appliance sends a Session Request for the particular DVT and a specified target LUN. Alternatively, an appliance may request creation of a DVT in conjunction with creation of a particular session for such DVT in a single request.

It is then determined whether host clustering has been specified for the requested session in operation 306. If host clustering is specified, a same appliance mirror is installed for all hosts that can access the specified target LUN in operation 308. In general, the mirror causes data that is written to the specified target LUN to be mirrored to the same appliance LUN. The process may also wait for new hosts to log into the DVT in operation 310. When a new host logs into the DVT, this same mirror is then installed for this new host if it also has access to the specified target LUN, in operation 308. It may also be determined whether the DVT is to be removed in operation 312. For instance, it is determined whether a request to remove the DVT has been received from the appliance. If the DVT is not to be removed (for now), the process may wait for new hosts to log into the DVT. The process continues until the DVT is removed in operation 318.

In some cases, host clustering is not specified by the appliance, for example, in the session request. For instance, the session request may specify a particular host, along with a specified target LUN, for implementing a mirror. When host clustering is not specified (or a particular host is identified in the session request), an appliance mirror is installed only for the specified host in operation 314. The process then waits for a "remove DVT" to be specified, for example, by the appliance in operation 316, after which the DVT is removed in operation 318. The procedure 300 then ends.

Figure 4:
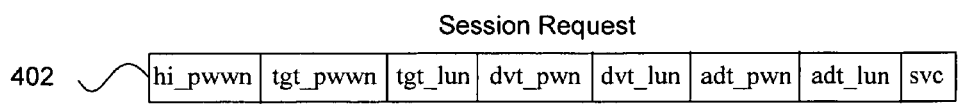
FIG. 4 is a diagrammatic representation of a Session Request in accordance with one embodiment of the present invention.

In one implementation, the appliance sends a Session Request as shown in FIG. 4 in accordance with one implementation of the present invention. The Session Request 402 of FIG. 4 may include the following fields: hi_pwwn, tgt_pwn, tgt_lun, dvt_pwn, dvt_lun, adt_pwn, adt_lun, and svc. The hi_pwwn field specifies the host or host cluster for which the session is to be created. The hi_pwwn is the field that is used by the appliance to specify whether the data WRITE's from different hosts are merged together into a single session or stream or separated into separate sessions or streams. If this field is set to a zero value, host clustering is indicated. Otherwise, this value is set to a particular host PWWN so as to specify a single session be created for such specified host.

There are particular situations in which the appliance will likely choose to have host data separated into separate SANTap sessions. For example, the appliance will likely choose separate SANTap sessions for different hosts for a target that implements LUN mapping. The reason for this is that different hosts can use a same target LUN that is then mapped by the target to different LUN's on the target. The data mirrored to the appliance for a particular target LUN, as specified by the host, would be corrupted if the appliance did not implement a LUN mapping for the mirrored data that is equivalent to the target LUN Mapping. When sending a request to create a session, the appliance indicates that it would like to separate I/O's from two or more hosts to the same target LUN into different streams by sending a session create request per each host that is accessing the target LUN and initializing the 'hi_pwwn' field to each host PWWN for each request.

In alternative implementations of DVT, the host PWWN is not needed as described further below. For instance, the above description for hi_pwwn applies when the DVT where the session is being created is either in TRANSPARENT or PROXY-2 mode, which modes are explained further below. In contrast, 'hi_pwwn' is not used to differentiate sessions when the DVT on which the session is being created operates in PROXY-1 mode. The tgt_pwwn and tgt_lun fields specify the target and target LUN, respectively, for which SANTap is to be performed.

The dvt_pwwn field may be used to specify the WWN of the DVT where the session is to be created. If this field is zero, it is assumed that the WWN of the DVT is the same as the WWN of the target. If this field is non-zero, then the session is being created on a DVT that has a WWN that is not the same as the target. The dvt_lun field can be used to specify the DVT LUN if it is not mapped in a predefined manner to the target LUN. Otherwise, this field may be set to zero and it is assumed that the DVT LUN of each host is mapped in a predefined manner to the target LUN that is to be tapped.

As each host logs into a particular DVT that has been set up for a particular target LUN, a unique DVT LUN may be set up for such host and such DVT LUN is associated with the particular target LUN. Prior to describing mechanisms for setting up DVT LUN's for each host, LUN mapping for a target is first described. When LUN mapping is implemented on a target, different hosts may use a same LUN for different LUN's on the target. For instance, a first host can write to LUN_1 on the target and the target maps this LUN to LUN_5, while a second host can write to the same LUN_1 on the target and the target maps this LUN to LUN_10. If a DVT LUN_1 is then set up to mirror data written to target LUN_1, data written by the first and second hosts would be mirrored to an appliance that requests data written to DVT LUN_1. The appliance would receive corrupted data since the streams for target PLUN_5 and PLUN_10 would be merged together and mirrored to the appliance since they are both written to LUN_1, which is later mapped separately by the target to PLUN_5 and PLUN_10. However, the appliance has no way of separating this merged data. Accordingly, when a DVT is set up for different hosts, different DVT LUN's are used for each host so that different target LUN's are not unintentionally merged when mirrored to a target. For example, a first host and a second host may both see all LUN's of a 256 LUN target. For instance, DVT LUN_0 through DVT LUN_255 are set up for a first host to access target LUN_0 through LUN_255, while DVT LUN_256 through DVT LUN_511 are set up for a second host to access target LUN_0 through LUN_255. Similar DVT LUN ranges may be set up for other hosts and offset by 256 from the highest range of LUN's. Also, if a host cannot see a particular target LUN, a corresponding DVT LUN is not created. In sum, a unique DVT LUN is set up for each target LUN that each host can see (or access).

Figure 5:
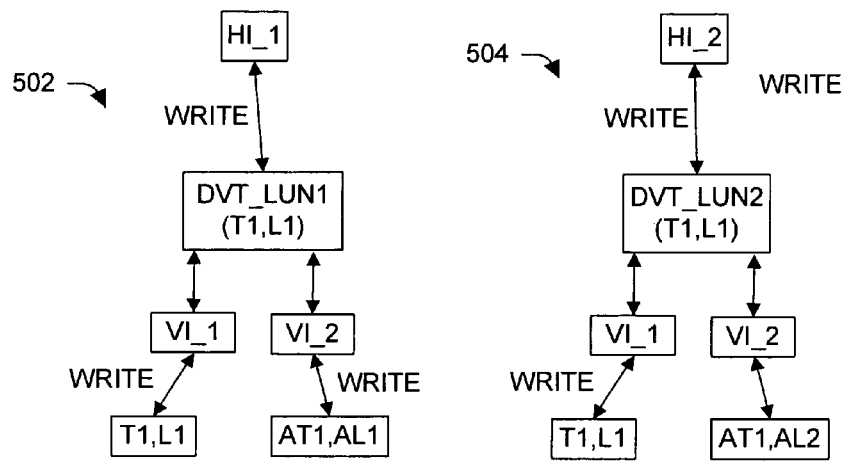
FIG. 5 illustrates two volume hierarchy data structures for mirroring data sent from two different hosts to an appliance in the form of two different streams.

FIG. 5 illustrates two volume hierarchy data structures 502 and 504 for a first host HI_1 and a second host HI_2 who are both writing to a same target LUN (T1, L1), where host clustering is not set up in the DVT for this target LUN (T1, L1). Since this data may potentially be mapped by the target to different PLUN's, two different DVT LUN's are set up for these two hosts, one for each host. As shown, DVT_LUN1 is set up for host HI_1 to communicate WRITE data to target LUN (T1,L1), while DVT_LUN2 is set up for host HI_2 to communicate WRITE data to target LUN (T1, L1). These DVT_LUN structures may also be used by the hosts for communicating READ data to the target LUN.

An appliance may then set up one or two SANTap session(s) for these DVT_LUN's. In the example of FIG. 5, host clustering is not enabled. That is, an appliance requests a session to be set up for host H1_1 and target LUN (T1,L1) and then requests a different session be set up for host H1_2 and target LUN (T1,L1). As a result of these two session requests by the appliance, two separate volume hierarchies 502 and

504 (or mirrors) are set up to mirror each session. As shown, WRITE data for host HI_1 is mirrored from DVT_LUN1 to appliance LUN (AT1, AL1) via a virtual initiator (VI_2), along side WRITE data being sent to the real target LUN (T1, L1) via virtual initiator (V1_1). In contrast, WRITE data for host HI_2 is mirrored from DVT_LUN2 to appliance LUN (AT1, AL2) via a virtual initiator (VI_2), along side WRITE data being sent to the real target LUN (T1, L1) via virtual initiator (V1_1). That is WRITE data from the two hosts HI_1 and HI_2 is mirrored in the form of two different sessions or data streams to two different appliance LUN's (AT1, AL1) and (AT1, AL2), respectively.

Figure 6:
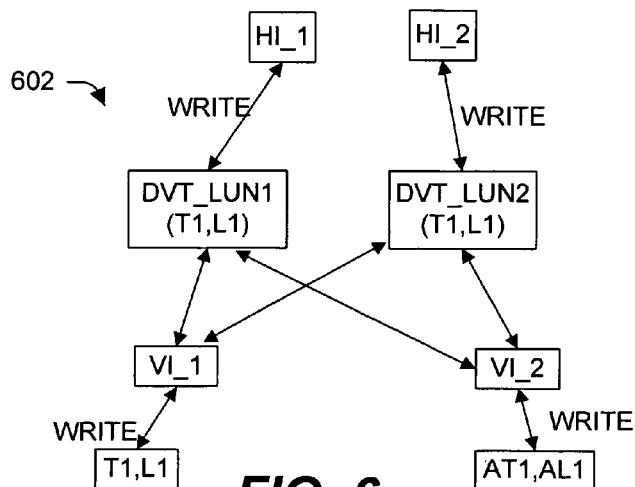
FIG. 6 illustrates a volume hierarchy data structure for mirroring data that is sent from a host cluster to an appliance in the form of a single stream, in accordance with one embodiment of the present invention.

When host clustering is enabled, the hosts of the host cluster really access the same PLUN's of a target and it makes sense to merge the data streams from the host cluster into a single SANTap session. FIG. 6 illustrates a single volume hierarchy data structure 602 for a first host HI_1 and a second host HI_2 who are both writing to a same target LUN (T1, L1), wherein host clustering is enabled for the two hosts, in accordance with one embodiment of the present invention. For example, hosts HI_1 and HI_2 belong to the same host cluster 202 as shown in FIG. 2.

When a session request is sent by an appliance for the particular target LUN (T1, L1) and such request specifies host clustering (e.g., by setting the hi_pwwn field to zero), the volume hierarchy data structure 602 of FIG. 6 is formed. For instance, the same appliance mirror (VI_2 and AT1, AL1) is attached to both DVT LUN's of the two hosts H1_1 and HI_2 that each have access to the specified target LUN (T1, L1). When host HI_1 communicates WRITE data to the specified target LUN (T1,L1) via its corresponding DVT_LUN1, this WRITE data is mirrored to the appliance LUN (AT1, AL1) via VI_2. Similarly when host HI_2 communicates WRITE data to the specified target LUN (T1,L1) via its different corresponding DVT_LUN2, this WRITE data is mirrored to the same appliance LUN (AT1, AL1) via VI_2.

In effect, the same appliance mirror (that mirrors WRITE data to the same appliance LUN), is added or coupled to both DVT_LUN's of the two hosts that have access to the specified target (T1, L1). If a new host, such as HI_3 of FIG. 2, logs into the same target LUN (T1, L1) or DVT (i.e., has access to the same T1,L1), a new DVT_LUN (e.g., DVT_LUN3) may be created for the new host HI_3 and the appliance mirror added to such new DVT_LUN.

Referring back to FIG. 4, the adt_pwwn and adt_lun fields of the Session Request specify the WWN of the appliance data target and the corresponding appliance LUN to where data is to be mirrored. In the example of FIG. 6, appliance PWWN and LUN are AT1, AL1, respectively, to which data from hosts H1_1 and H1_2 sent to target LUN (T1,L1) is to be mirrored. The svc field specifies the particular service to which the data is being mirrored for this session and specified LUN.

Mechanisms for setting up SANTap's general data tapping feature may include any suitable configuration procedures for implementing a virtual entity. Each initiator and appliance involved with a SANTap session is coupled with a port (e.g., FC port) on a network device (e.g., switch). This coupling may be direct or indirect. That is, the initiator or appliance may be coupled through one or more other network devices (e.g., switches or routers) as explained further below with respect to different data tapping modes of operation. Additionally, the appliance may access the data tap switch via any suitable network devices, such as other switches and/or routers. Of course, the initiator and appliance may also have access to other switches that serve the same target (e.g., a redundant switch). In this example, it is assumed that the targets or storage devices are already coupled with the switch.

Security, VSANs, zones, etc. may also be configured and the ports enabled on the data tap switch. For example, the switch may be configured with an SNMP username and password to allow access to the switch by users. VSAN groups and zones may also be configured on the switch for each port/slot, for example. Specific ports/slots of the data tap switch may then be enabled for a data tap. That is, particular ports and/or slots may be designated as allowing data tapping, while others are designated as not allowing data tapping. These switch configurations may be configured by any suitable entity, such as an administrator or software agent.

A DVT (and VI) may take any suitable form for facilitating the data tap between an initiator and target. Three modes are described herein: proxy mode 1, proxy mode 2, and transparent mode. Each of these modes has its own associated advantages, as well as disadvantages. Each of these modes uses different identities for the DVT, where each identity is in the form of a World Wide Name (WWN) and Fibre Channel Network Identifier (FCID). Within a Fibre Channel network, all Fibre Channel devices have a World Wide Name (WWN). More specifically, a Node WWN (NWWN) is the WWN of the node that is connected to a particular port. In other words, the NWWN is the WWN of the system, storage device, or subsystem that is connected to the switch port. In addition to a Node WWN, a Port WWN (PWWN) serves as a given name for a particular port (FWWN for a particular fiber port). A Fibre Channel network ID (FCID) for the particular switch port is used to identify the physical location of a port. Each Fibre Channel device may have multiple ports, each of which is uniquely identified by a NWWN and a PWWN. In the following description, PWWN or NWWN may be used interchangeably with the shortened identifier "WWN."

In the proxy mode 1, the DVT gets a new PWWN and a new FCID. This arrangement allows the initiator and target to sit anywhere in the network and not be directly coupled to a port of the switch on which resides the DVT. That is, the DVT may reside anywhere in the network with respect to the initiator and target. When the initiator sends data to the DVT, the routing protocol will then work to forward the data to the DVT wherever it resides. When the data reaches the DVT, the routing then handles forwarding the data to the target and appliance (e.g., via a VI associated with the DVT).

Figure 7A:
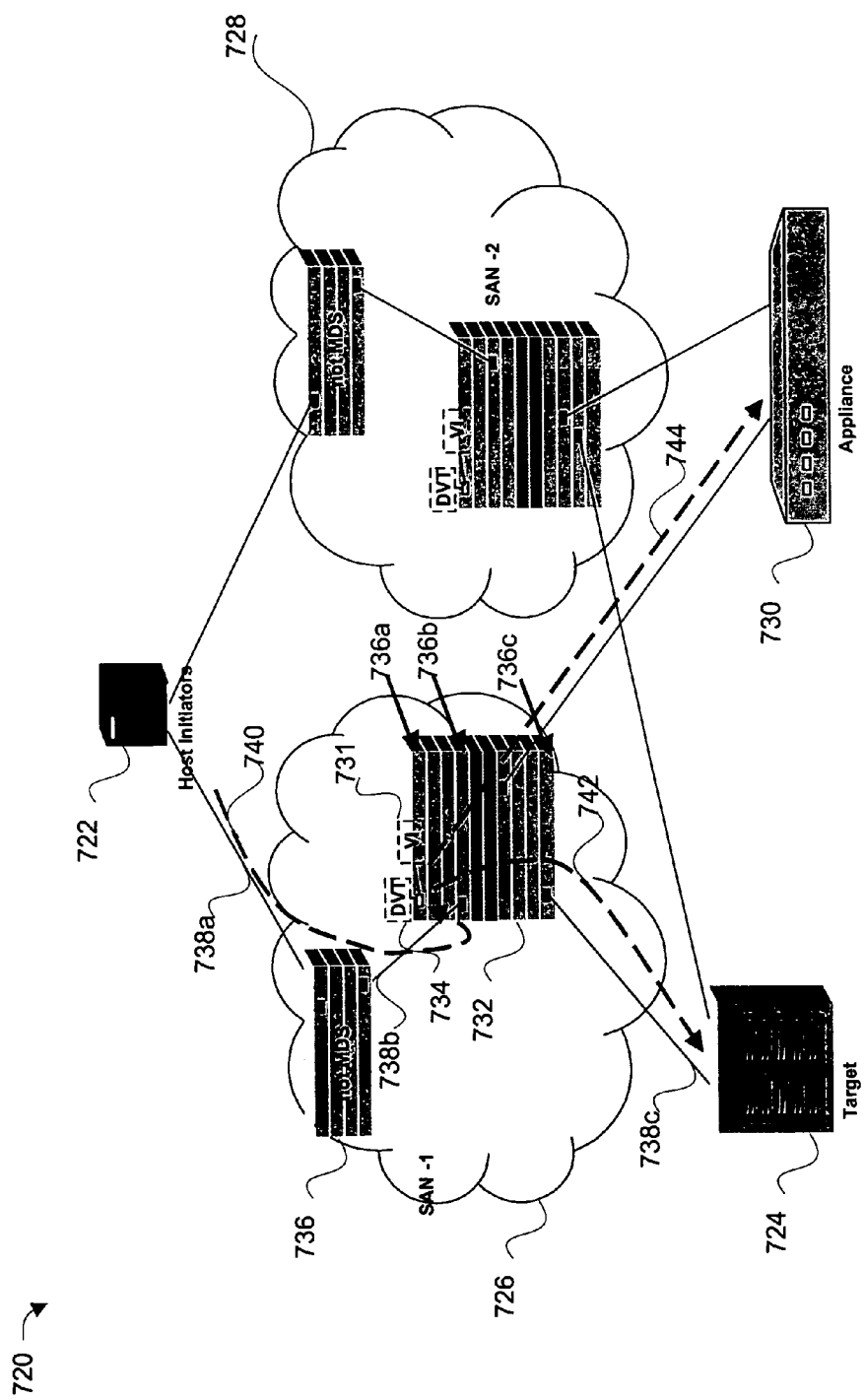
FIG. 7A illustrates a data tapping configuration in a first proxy mode (proxy mode 1) of operation in accordance with a first implementation of the present invention.

FIG. 7A illustrates a data tapping configuration in a first proxy mode (proxy mode 1) of operation in accordance with a first implementation of the present invention. As shown, a host initiator 722 is coupled to a non-MDS switch 736 that is not configurable with a DVT. The non-MDS switch 736 is itself coupled to an MDS switch 732 on which resides a DVT 734. The MDS switch 732 is coupled to a target 724. The devices in the path between the initiator and the target represent a first SAN 726. Also shown is a redundant path between the initiator 722 through a second SAN 728. Either path may be used by initiator 722, depending on which path is active or failing.

Since the DVT has a unique PWWN and FCID, the DVT 734 can be positioned in a different path than the path that is between the initiator 722 and the target 724 and data can still be routed properly from the initiator to the DVT and then to the target. Also, the path between the initiator and target may contain non-MDS switches that simply are configured to route data to ports or nodes having unique PWWN and FCID pairs and do not have to be configured to implement MDS functions such as VSAN groups.

As shown for the first SAN 726, the DVT 734 and VI 731 reside on a different intelligent line card in the MDS switch 732 than the ports which are coupled directly to the non-MDS switch 736 (and indirectly the initiator) and target 724. That is, the initiator 722 is coupled to a port on the non-MDS switch 736 via path 738a; the non-MDS switch 736 is then coupled directly to a port of line card 736b of MDS switch 732 via path 738b; and a port the MDS switch 732 on line card 736c is coupled directly to the target via path 738c. In contrast, the DVT 734 is in the form of a port that resides on line card 736a. Data can be routed from the initiator to the target 724 through paths 740 and 742. The data or a copy of the data is also routed via path 744 to appliance 730. A standard routing protocol is used to accomplish these data routes.

Of course in this implementation, the initiator 722 needs to obtain the new PWWN and new FCID of the DVT. In this case, when the DVT is created in the switch, the initiator is not aware of the new FCID or new PWWN. That is, the initiator 722 is only aware of the PWWN and FCID that were obtained from the switch in its initial login procedure to the switch 732 port. The initiator needs to know the new FCID and PWWN of the new target DVT in order to access the new target (i.e., DVT). Also, many current implementations do not make use of mechanisms for initiators to automatically learn about new available targets (i.e., DVT). Instead, files are typically manually created on a host to tell it what targets it must use. Thus, under current protocols the initiator's configuration is changed so that the new PWWN and new FCID of a new DVT are provided to the associated initiator 722. In one implementation, an administrator may configure these identifies (e.g., PWWN and FCID of the DVT) in the initiator 722 after a new DVT is set up. More typically, the initiator is configured with the new PWWN and obtains the new FCID by a new login procedure to the name server using the PWWN of the target. Mappings between the DVT and both the real target and appliance are also set up in the switch to facilitate routing and data tapping.

Perhaps in future protocol versions when mechanisms are universally implemented to automatically inform the initiator of new targets, the initiators will never have to be manually configured. Since under the present protocol the initiator needs to be configured with the new PWWN and FCID, this mode is disruptive and data exchange between the initiator and DVT cannot commence until reconfiguration is complete.

Figure 7B:
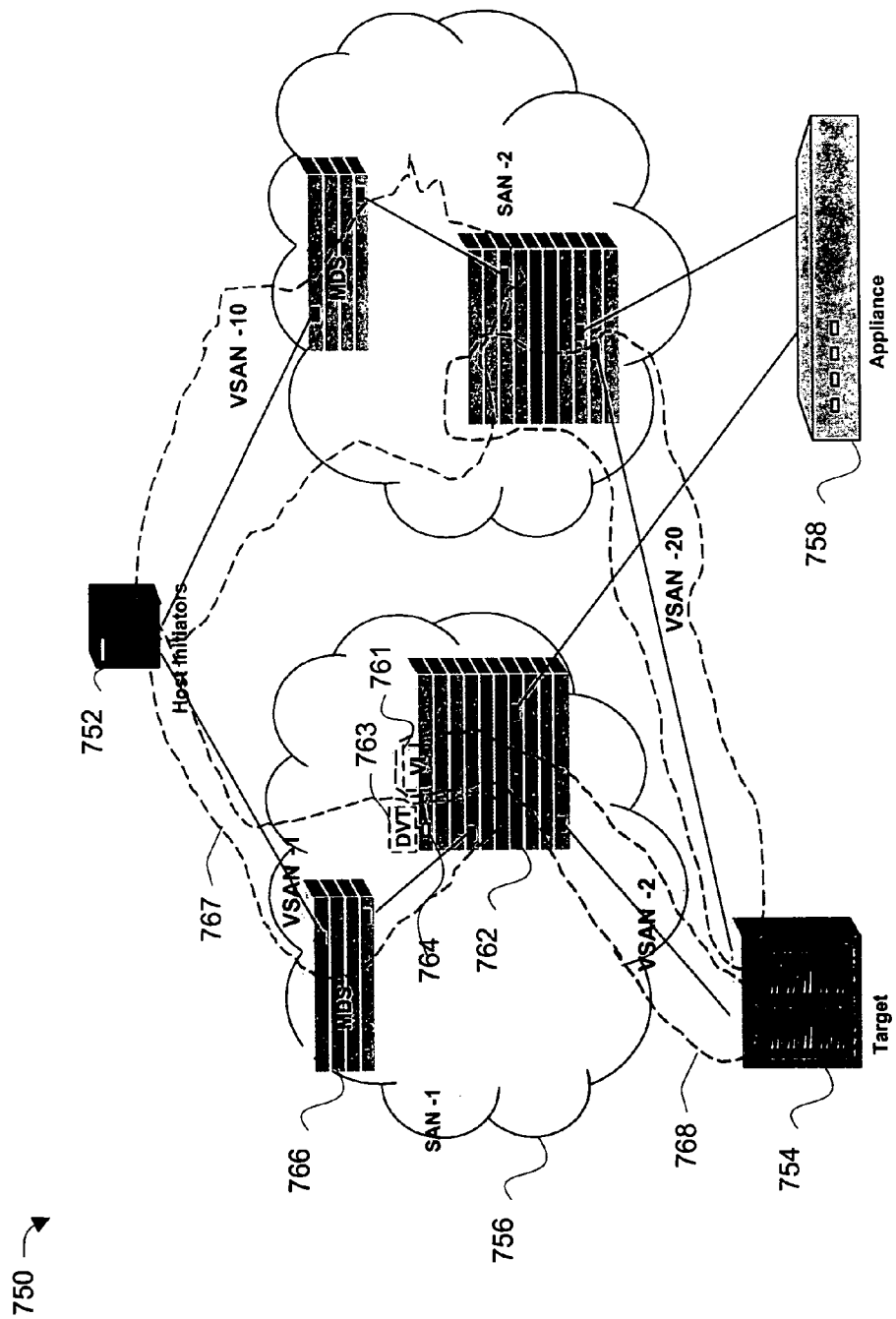
FIG. 7B illustrates a data tapping configuration in a second proxy mode (proxy mode 2) of operation in accordance with a second implementation of the present invention.

FIG. 7B illustrates a data tapping configuration in a second proxy mode (proxy mode 2) of operation in accordance with a second implementation of the present invention. In this mode, the DVT has the same PWWN as the corresponding target and a new FCID that differs from the target's FCID. In this mode, the initiator does not have to be reconfigured with the PWWN of the target. In one implementation of the Fibre Channel protocol, the initiator can use this same PWWN of the original target to then log in to get the new FCID of the new DVT. For instance, the initiator disconnects and reconnects to the switch (or the data tap service sends a disconnect to the initiator which would result in an automatic reconnect) to perform an initialization procedure so as to obtain the new FCID of the new DVT. Alternatively, the initiator can accomplish the same thing by performing a software restart.

In a current implementation (and perhaps future implementations) of Fibre Channel protocol, the same target cannot have a same PWWN unless they reside in different VSANs. Thus, DVT belongs to a first VSAN 767, while the original target and target port belong to a second different VSAN 768. Another entity referred to as a virtual initiator (VI) 761 may also be used to log into the target to obtain identification information (e.g., FCID) of the target and then to route data received at the DVT 764 from itself in its role as an initiator to the target 754. In this implementation, the VI 761 belongs to the same VSAN 768 as the target 754. If there are any switches present between the initiator and the switch that is implementing the DVT, the intervening switches have to be configurable with a particular VSAN. That is, an intervening switch between the initiator and the DVT switch has to be configured with the same VSAN as the DVT. In the illustrated embodiment, a MDS switch 766 is present between the initiator 752 and the switch 762 having the DVT 763 although any suitable switch that implements VSANs may be utilized. Likewise, any intervening switch positioned between the switch 762 having the DVT 763 and VI 761 and the target 754 needs to be configurable with a particular VSAN (not shown). That is, an intervening switch between the initiator and the DVT (or VI) switch has the same VSAN as the VI. The intervening switch also allows traffic for its own VSAN.

In both proxy modes 1 and 2, the VI uses a different FCID then the DVT. In the proxy mode 2, the VI also uses different FCIDs when sending data to the real target and the appliance, while in proxy mode 1 the VI uses the same FCID. In a specific proxy mode 2 implementation, two VIs are used: one to write to the real target and the other to write to the appliance. These two VIs have different FCIDs and different WWNs. The reason that the DVT and VIs have different FCIDs in proxy mode 2 is that the VIs are sending data to different VSANs when they are sending data to the appliance and the target. That is, the appliance is either in the same VSAN as the initiator or the target, but not both. The Appliance could also be in a third VSAN which is neither the initiator VSAN nor the target VSAN. Thus, the VIs must have a unique identity in each VSAN in order to send data to each VSAN.

Both of the proxy modes 1 and 2 require some reconfiguration and/or re-initialization of the initiator to obtain a new PWWN and/or new FCID of the new DVT. Another mode that does not require any reconfiguration or re-initialization of the initiator is referred to as a "transparent mode." The transparent mode includes setting up a new DVT that has a same PWWN and same FCID as the original target. In other words, creation of a new DVT (and VI) between the initiator and original target does not cause any disruption in the communication between the initiator and original target. Once the DVT is set up, data flows seamlessly between the initiator and original target without any changes from the initiator's or the target's side. Advantageously, the initiator does not have to be informed about the new DVT, but can simply continue sending data to the original target before, during, and after creation of a new DVT without disruption.

In this implementation, the DVT and its associated VI can merely serve as software entities and do not require any physical manifestation. That is, the new DVT does not have to be advertised to the devices outside the switch as an available physical target. The initiators do not have to become aware of the new DVT. The DVT and VI can merely serve as entities that perform the data tapping between the initiator and the real target.

Figure 7C:
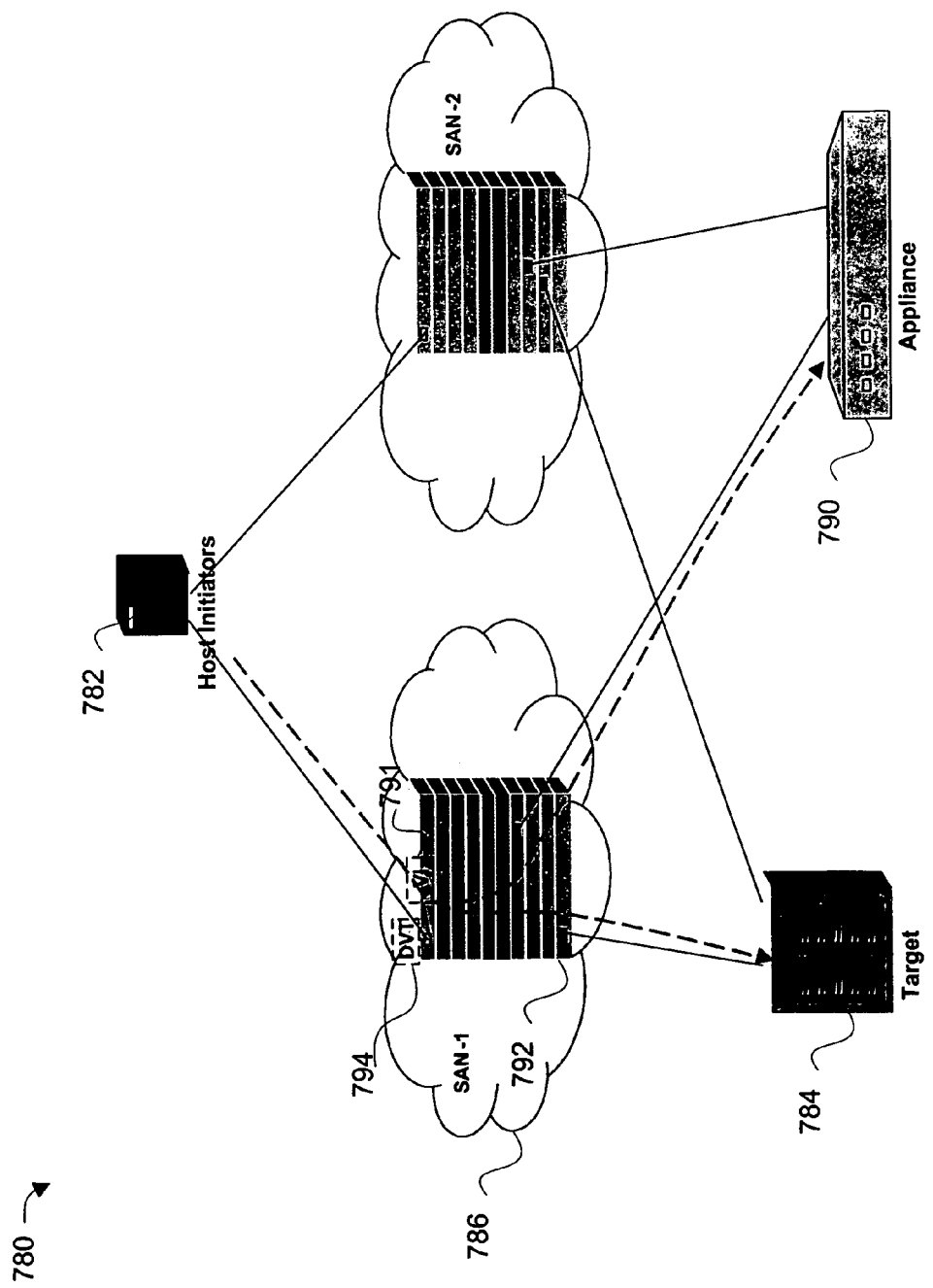
FIG. 7C is a diagrammatic representation of an example data tapping configuration in a transparent mode in accordance with a third implementation of the present invention.

FIG. 7C is a diagrammatic representation of an example data tapping configuration in a transparent mode in accordance with a third implementation of the present invention. As shown, an initiator 782 is coupled with switch 792 of SAN 786. The switch 792 is coupled with a target 784 and an appliance 790. When a DVT 794 having the same PWWN and FCID as the target 784 is created in the switch, data is, in effect, routed from the initiator 782 to the DVT 794. A virtual initiator (VI) 791 then routes the data received by the DVT to both the target 784 and the corresponding appliance 790. In a sense, the DVT can be said to merely snoop the traffic going from the initiator to the target. The DVT identifies traffic going between the initiator and target and copies such identified data. This copied data is then routed to the appliance 784.

In this implementation, the DVT needs to be placed in the routing path between the initiator and the target so as to ensure that the DVT receives the data sent between the initiator and target. Thus, in the illustrated implementation, the initiator and target are both coupled directly to the switch although only one of these devices needs to be connected directly to the switch that contains the data tapping DVT for such devices.

For all three modes relationships between the new DVT, initiator, original target, and appliance are also retained or set up in the switch. In one implementation, mappings between the connected entities are generated in the switch to thereby facilitate routing between the initiator and the new DVT, between the new DVT (and new VI) and the original target, and between the new DVT (and VI) and appliance, as well as the data tapping features for sending data from the DVT to both the original target and the corresponding appliance. VSAN and zoning may also be setup for each new DVT and VI pair. Several embodiments for creating a virtual port and their associated mappings are further described in co-pending U.S. patent applications (1) application Ser. No. 10/056,238 entitled "METHODS AND APPARATUS FOR IMPLEMENTING VIRTUALIZATION OF STORAGE WITHIN A STORAGE AREA NETWORK" filed 23 Jan. 2002 by Thomas James Edsall et al. and (2) application Ser. No. 10/045,883 entitled "METHODS AND APPARATUS FOR IMPLEMENTING VIRTUALIZATION OF STORAGE WITHIN A STORAGE AREA NETWORK THROUGH A VIRTUAL ENCLOSURE" filed 9 Jan. 2002 by Sanjaya Kumar et al., which applications are herein incorporated by reference in their entirety for all purposes.

FIG. 8 is a diagrammatic representation of one example of a fibre channel switch 801 that can be used to implement techniques of the present invention. Although one particular configuration will be described, it should be noted that a wide variety of switch and router configurations are available. The switch 801 may include, for example, at least one interface for communicating with one or more SANTap(s) 802. In at least one implementation, the SANTap 802 may reside external to the switch 801, and may also be accessed via a command line interface (CLI) 804. The switch 801 may include at least one interface for accessing external metadata information 810.

The switch 801 may include one or more supervisors 811 and power supply 817. According to various embodiments, the supervisor 811 has its own processor, memory, and/or storage resources. Additionally, the supervisor 811 may also include one or more SANTap clients (e.g., SANTap client 812) which may be adapted, for example, for facilitating communication between the SANTap 802 and the switch. The supervisor's SANTap clients may also each be accessed via a command line interface (CLI), e.g., 814.

Line cards 803, 805, and 807 can communicate with an active supervisor 811 through interface circuitry 863, 865, and 867 and the backplane 815. According to various embodiments, each line card includes a plurality of ports that can act as either input ports or output ports for communication with external fibre channel network entities 851 and 853. An example of at least a portion of a line card is illustrated in FIG. 9 of the drawings.

The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. The fibre channel switch can also include line cards 875 and 877 with IP ports 885 and 887. In one example, IP port 885 is coupled to an external IP network entity 855. The line cards 875 and 877 also have interfaces 895 and 897 to the backplane 815.

It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, port manager, FLOGI server, utility applications, etc. The supervisor may include one or more processors coupled to interfaces for communicating with other entities.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

FIG. 9 is a block diagram illustrating a portion of an exemplary switch or intelligent line card in which various embodiments of the present invention may be implemented. According to a specific embodiment, switch portion 980 of FIG. 9 may be implemented as one of a plurality of line cards residing in a fibre channel switch such as that illustrated in FIG. 8, for example. In at least one implementation, switch portion 980 may include a plurality of different components such as, for example, at least one external interface 981, at least one data path processor (DPP) 990, at least one control path processor (CPP) 992, at least one internal interface 983, etc.

As shown in the example of FIG. 9 the external interface of 981 may include a plurality of ports 982 configured or designed to communicate with external devices such as, for example, host devices, storage devices, etc. One or more groups of ports may be managed by a respective data path processor (DPP) unit. According to a specific implementation the data path processor may be configured or designed as a general-purpose microprocessor used to terminate the SCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 982 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure)

on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 9, switch portion 980 may also include a control path processor (CPP) 992 configured or designed to perform control path processing for storage virtualization. In at least one implementation, functions performed by the control path processor may include, for example, calculating or generating virtual-to-physical (V2P) mappings, processing of port login and process login for volumes; communicating with name server(s); etc.

Although the foregoing invention has been described in some detail for purposes of clarity of understanding, it will be apparent that certain changes and modifications may be practiced within the scope of the appended claims. For example, although a DVT is described as tapping data for one or more specific sessions, of course, the DVT data tapping may be configured to tap all data for a specific target or specific LUN of a target, etc. Therefore, the described embodiments should be taken as illustrative and not restrictive, and the invention should not be limited to the details given herein but should be defined by the following claims and their full scope of equivalents.

What is claimed is:

1. A method of tapping data in a storage area network (SAN), the method comprising:
receiving a request for tapping data sent from a host cluster to a particular target logical unit (LUN) of a storage device of the SAN so that the data is mirrored to an appliance; and
when any host of the host cluster writes data to the particular target LUN, mirroring such data to the appliance,
wherein the request for tapping data is in the form of a first request for creating a data virtual target (DVT) corresponding to the particular storage device and a second request for creating a session that includes the particular target LUN for such DVT.

2. A method as recited in claim 1, wherein data written by any of the hosts of the host cluster to the particular target LUN is mirrored together in a single first stream to the appliance.

3. A method as recited in claim 2, wherein data written by any of the hosts of the host cluster to the particular target LUN is mirrored to a same LUN of the appliance.

4. A method as recited in claim 1, wherein the second request has a host initiator field that is set to indicate host clustering.

5. A method as recited in claim 4, wherein the host initiator field is set equal to zero, wherein a zero value indicates host clustering and a nonzero value would identify a particular host for data tapping.

6. A method as recited in claim 5, wherein mirroring the data to the appliance is accomplished by installing a same appliance mirror for all hosts that have access to the particular target LUN.

7. A method as recited in claim 6, wherein the same appliance minor causes the data to be mirrored to a same LUN of the appliance.

8. A method as recited in claim 7, further comprising:
waiting for a new host to log into the DVT; and
installing the same appliance mirror for the new host if the new host has access to the particular target LUN.

9. A method of tapping data in a storage area network (SAN), the method comprising:
receiving a request for tapping data sent from a host cluster to a particular target logical unit (LUN) of a storage device of the SAN so that the data is mirrored to an appliance;
when any host of the host cluster writes data to the particular target LUN, mirroring such data to the appliance, wherein data written by any of the hosts of the host cluster to the particular target LUN is mirrored together in a single first stream to the appliance;
receiving a request for tapping data sent between a specific host and the particular target LUN; and
when the specified host writes second data to the particular target LUN, mirroring such second data to the appliance, wherein the second data is sent in a second stream to the appliance and the second stream differs from the first stream.

10. A method as recited in claim 9, wherein the first stream is sent to a first LUN of the appliance and the second stream is sent to a second LUN of the appliance.

11. An apparatus for tapping data in a storage area network (SAN), comprising:
one or more processors;
one or more memory, wherein at least one of the processors and memory are adapted for:
receiving a request for tapping data sent from a host cluster to a particular target logical unit (LUN) of a storage device of the SAN so that the data is mirrored to an appliance; and
when any host of the host cluster writes data to the particular target LUN, mirroring such data to the appliance,
wherein the request for tapping data is in the form of a first request for creating a data virtual target (DVT) corresponding to the particular storage device and a second request for creating a session that includes the particular target LUN for such DVT.

12. An apparatus as recited in claim 11, wherein data written by any of the hosts of the host cluster to the particular target LUN is mirrored together in a single first stream to the appliance.

13. An apparatus as recited in claim 12, wherein data written by any of the hosts of the host cluster to the particular target LUN is mirrored to a same LUN of the appliance.

14. An apparatus as recited in claim 11, wherein the second request has a host initiator field that is set to indicate host clustering.

15. An apparatus as recited in claim 14, wherein the host initiator field is set equal to zero, wherein a zero value indicates host clustering and a nonzero value would identify a particular host for data tapping.

16. An apparatus as recited in claim 15, wherein mirroring the data to the appliance is accomplished by installing a same appliance mirror for all hosts that have access to the particular target LUN.

17. An apparatus as recited in claim 16, wherein the same appliance mirror causes the data to be mirrored to a same LUN of the appliance.

18. An apparatus as recited in claim 17, wherein the at least one of the processors and memory are further adapted for:
waiting for a new host to log into the DVT; and
installing the same appliance mirror for the new host if the new host has access to the particular target LUN.

19. An apparatus for tapping data in a storage area network (SAN), comprising:
one or more processors;
one or more memory, wherein at least one of the processors and memory are adapted for:

receiving a request for tapping data sent from a host cluster to a particular target logical unit (LUN) of a storage device of the SAN so that the data is mirrored to an appliance;

when any host of the host cluster writes data to the particular target LUN, mirroring such data to the appliance, wherein data written by any of the hosts of the host cluster to the particular target LUN is mirrored together in a single first stream to the appliance;

receiving a request for tapping data sent between a specific host and the particular target LUN; and when the specified host writes second data to the particular target LUN, mirroring such second data to the appliance, wherein the second data is sent in a second stream to the appliance and the second stream differs from the first stream.

20. An apparatus as recited in claim 19, wherein the first stream is sent to a first LUN of the appliance and the second stream is sent to a second LUN of the appliance.

21. An apparatus for tapping data in a storage area network (SAN), comprising:

means for receiving a request for tapping data sent from a host cluster to a particular target logical unit (LUN) of a storage device of the SAN so that the data is mirrored to an appliance; and means for when any host of the host cluster writes data to the particular target LUN, mirroring such data to the appliance, wherein the request for tapping data is in the form of a first request for creating a data virtual target (DVT) corresponding to the particular storage device and a second request for creating a session that includes the particular target LUN for such DVT.

22. A system for tapping data in a storage area network (SAN), comprising:

a host cluster having a plurality of hosts;

a storage device for storing data;

an appliance for tapping data in the SAN;

a network device in the SAN operable to:

receive from the appliance a request for tapping data sent from the host cluster to a particular target logical unit (LUN) of a storage device of the SAN so that the data is mirrored to the appliance; and when any host of the host cluster writes data to the particular target LUN, mirror such data to the appliance, wherein the request for tapping data is in the form of a first request for creating a data virtual target (DVT) corresponding to the particular storage device and a second request for creating a session that includes the particular target LUN for such DVT.

* * * * *